United States Patent
Moore et al.

(10) Patent No.: US 6,752,575 B1
(45) Date of Patent: Jun. 22, 2004

(54) PORTABLE, SCALABLY ADJUSTABLE CARGO SECUREMENT APPARATUS

(76) Inventors: Manfred Moore, 1672 Buckingham Rd., Los Angeles, CA (US) 90019; Louis Cravens, 8805 Lemona Ave., North Hills, CA (US) 91343

( * ) Notice: Subject to any disclaimer, the term of this patent is extended or adjusted under 35 U.S.C. 154(b) by 0 days.

(21) Appl. No.: 10/145,351

(22) Filed: May 13, 2002

(51) Int. Cl.$^7$ ................................................ B60P 7/08
(52) U.S. Cl. ........................ 410/129; 410/94; 410/121
(58) Field of Search ........................ 410/94, 121, 129, 410/140, 151; 296/24.1, 37.6; 224/404, 42.33, 550

(56) References Cited

U.S. PATENT DOCUMENTS

| | | | |
|---|---|---|---|
| 3,995,565 A | 12/1976 | Kersey | |
| 4,236,854 A | 12/1980 | Rogers | 410/121 |
| 4,492,499 A | 1/1985 | Gasper | 410/32 |
| 4,770,579 A | 9/1988 | Aksamit | 410/150 |
| 4,838,745 A * | 6/1989 | Haydock | 410/121 |
| 4,941,784 A * | 7/1990 | Flament | 410/121 |
| 5,082,404 A | 1/1992 | Stewart et al. | 410/127 |
| 5,161,762 A | 11/1992 | Stewart et al. | |
| 5,516,245 A | 5/1996 | Cassidy | 410/101 |
| 5,697,742 A * | 12/1997 | House | 410/127 |
| 5,709,512 A * | 1/1998 | Smith | 410/129 |
| 5,769,580 A | 6/1998 | Purvis | 410/151 |
| 5,800,145 A * | 9/1998 | Kelce | 410/142 |
| 6,042,312 A | 3/2000 | Durham, II | 410/143 |
| 6,068,433 A | 5/2000 | Baloga | 410/145 |
| 6,077,007 A * | 6/2000 | Porter et al. | 410/140 |
| 6,089,803 A * | 7/2000 | Holland | 410/129 |
| 6,089,804 A * | 7/2000 | Bartelt | 410/140 |
| 6,109,847 A * | 8/2000 | Patel et al. | 410/129 |
| 6,174,116 B1 * | 1/2001 | Brand | 410/140 |
| 6,206,624 B1 * | 3/2001 | Brandenburg | 410/132 |
| 6,244,802 B1 * | 6/2001 | Stanesic et al. | 410/94 |
| 6,582,169 B1 * | 6/2003 | Cano-Rodriguez et al. | 410/128 |

FOREIGN PATENT DOCUMENTS

DE            2633467 A1 *    2/1978   ................. 224/550

* cited by examiner

*Primary Examiner*—Stephen Gordon
(74) *Attorney, Agent, or Firm*—John D. Gugliotta; P. Jeff Martin

(57) ABSTRACT

A portable, scalably adjustable cargo securement apparatus is provided which includes laterally extensible rail members, longitudinally extensible rail members, and elongated stabilizer arbors having an elongated, tubular configuration generally circular in cross-section which interconnect via a plurality of impingement locking brackets so as to form a generally square-shaped framework for confining cargo within its boundaries. The impingement locking brackets function to allow for selective, lateral and longitudinal slidable engagement by laterally extensible rail members and longitudinally extensible rail members. The cargo securement apparatus is adapted to be utilized in a cargo area of sport utility vehicles. A plurality of feet function to bear against a cargo floor, thereby according balanced stability to the cargo securement apparatus. A threaded adjustment stud is threadedly received within the laterally extensible rail member and the longitudinally extensible rail member in order to facilitate congruous leveling.

17 Claims, 5 Drawing Sheets

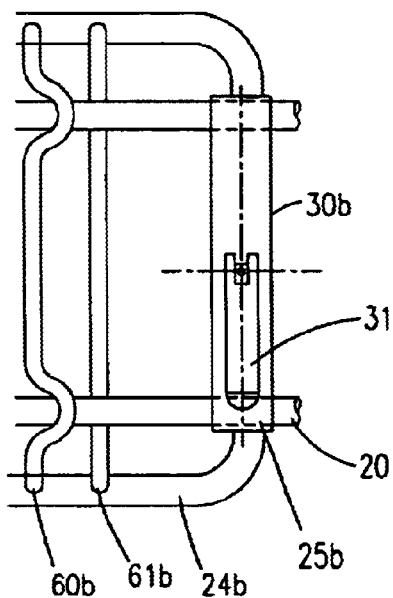
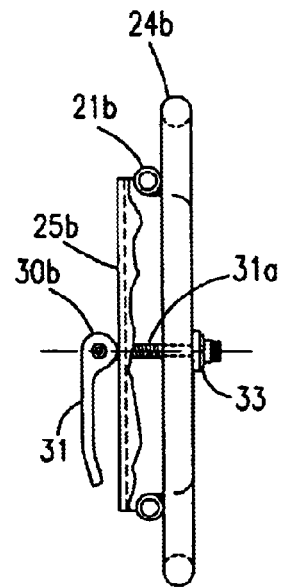
*Fig. 4*  *Fig. 5*
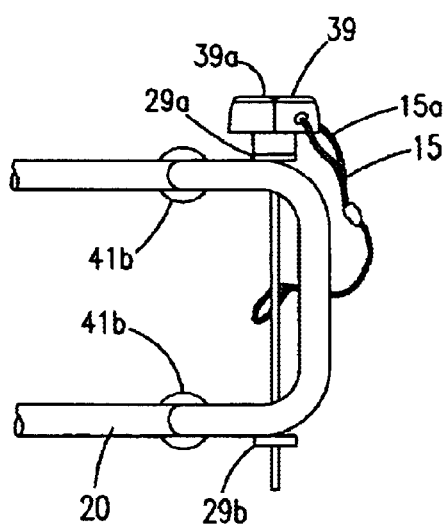
*Fig. 6*

PORTABLE, SCALABLY ADJUSTABLE CARGO SECUREMENT APPARATUS

RELATED APPLICATIONS

The present invention was first described in Disclosure Document No. 499,385 filed on Sep. 4, 2001. There are no previously filed, nor currently any co-pending applications, anywhere in the world.

BACKGROUND OF THE INVENTION

1. Field of the Invention

The present invention relates generally to cargo control devices and, more particularly, to a portable, scalably adjustable cargo securement apparatus.

2. Description of the Related Art

The utilization of sport utility vehicles for both pleasure and sport has dramatically increased in recent years. While most sport utility vehicles are inherently spacious for carrying cargo and common items such as groceries, sporting equipment, luggage, packages, and the like, these vehicles have failed to provide practical and effective devices for securing cargo and other items within the cargo area. In addition, shifting cargo can not only damage the cargo itself and distract the driver, but can also damage the vehicle.

Accordingly, a need has arisen for a means by which cargo can be securely confined within the cargo area of a sport utility vehicle and which is readily scalable to a relatively small size so as to facilitate easy removal and transportability. The development of the portable, scalably adjustable cargo securement apparatus fulfills this need.

A search of the prior art did not disclose any patents that read directly on the claims of the instant invention; however, the following references were considered related:

| U.S. Pat. No. | Inventor | Issue Date |
| --- | --- | --- |
| 5,516,245 | Cassidy | May 14, 1996 |
| 3,995,565 | Kersey | Dec. 7, 1976 |
| 4,236,854 | Rogers | Dec. 2, 1980 |
| 4,492,499 | Gasper | Jan. 8, 1985 |
| 5,769,580 | Purvis | Jun. 23, 1998 |
| 6,068,433 | Baloga | May 30, 2000 |
| 4,770,579 | Aksamit | Sep. 13, 1988 |
| 6,042,312 | Durham, II | Mar. 28, 2000 |
| 5,161,762 | Stewart et al. | Nov. 10, 1992 |

Consequently, a need has been felt for providing a device which aids in securely confining cargo of various dimensions within the cargo area of a sport utility vehicle in a manner which is quick, easy, and efficient.

SUMMARY OF THE INVENTION

Therefore, it is an object of the present invention to provide laterally extensible rail members, longitudinally extensible rail members, and elongated stabilizing arbors interconnected so as to form a scalably adjustable framework for effectively confining cargo within its boundaries.

It is another object of the present invention to provide a plurality of impingement locking brackets which interconnect the extensible rail members and stabilizing arbors and which allow for the manual horizontal and longitudinal adjustment thereof.

It is another object of the present invention to provide an adjustable cargo securement device adapted to be utilized in the cargo area of sport utility vehicles.

It is another object of the present invention to provide a leveling means to facilitate congruous leveling of the cargo securement device.

It is another object of the present invention to provide a plurality of feet for bearing against the cargo floor so as to accord balanced stability to the framework.

It is another object of the present invention to provide a framework being laterally extensible from approximately 24 inches to 48 inches.

It is another object of the present invention to provide a framework being longitudinally extensible from approximately 24 inches to 48 inches.

Briefly described according to one embodiment of the present invention, a portable, scalably adjustable cargo securement apparatus comprises laterally extensible rail members, longitudinally extensible rail members, and elongated stabilizer arbors defined as having an elongated, tubular configuration generally circular in cross-section which interconnect via a plurality of impingement locking brackets so as to form a generally square-shaped framework for confining cargo within its boundaries. The impingement locking brackets function to allow for selective, lateral and longitudinal slidable engagement by laterally extensible rail members and longitudinally extensible rail members. The cargo securement apparatus is fabricated of a lightweight, yet strong metal material, such as aluminum, and is adapted to be utilized in a cargo area of sport utility vehicles.

A cam pin extends perpendicularly through an end of a longitudinally extensible rail member and is held fixedly in place via a pair of opposed locking flanges. A lanyard is provided having a looped end which passes through a cam pin knob.

The cargo securement apparatus is designed and configured so as to be laterally extensible from approximately 24 inches to approximately 48 inches, and longitudinally extensible from approximately 24 inches to approximately 48 inches.

Being both lightweight and laterally and longitudinally extensible, the cargo securement apparatus not only provides a device which effectively prevents the shifting of cargo, but also provides an easily removable device readily scalable to a relatively small size facilitating transportability.

A leveling means is provided to facilitate congruous leveling of the securement apparatus.

Finally, a plurality of feet are provided which function to bear against a cargo floor, thereby according balanced stability to the cargo securement apparatus.

The use of the present invention aids in securely confining cargo of various dimensions within the cargo area of a sport utility vehicle in a manner which is quick, easy, and efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4 is front side view of the cam locking assembly;

FIG. 5 is a side elevational view of a cam locking handle shown pivotally attached to a cam locking bracket;

FIG. 6 is a partial front end elevational view of the cam pin shown extending through a longitudinally extensible rail member;

DESCRIPTION OF THE PREFERRED EMBODIMENT

1. Detailed Description of the Figures

Figure 1:
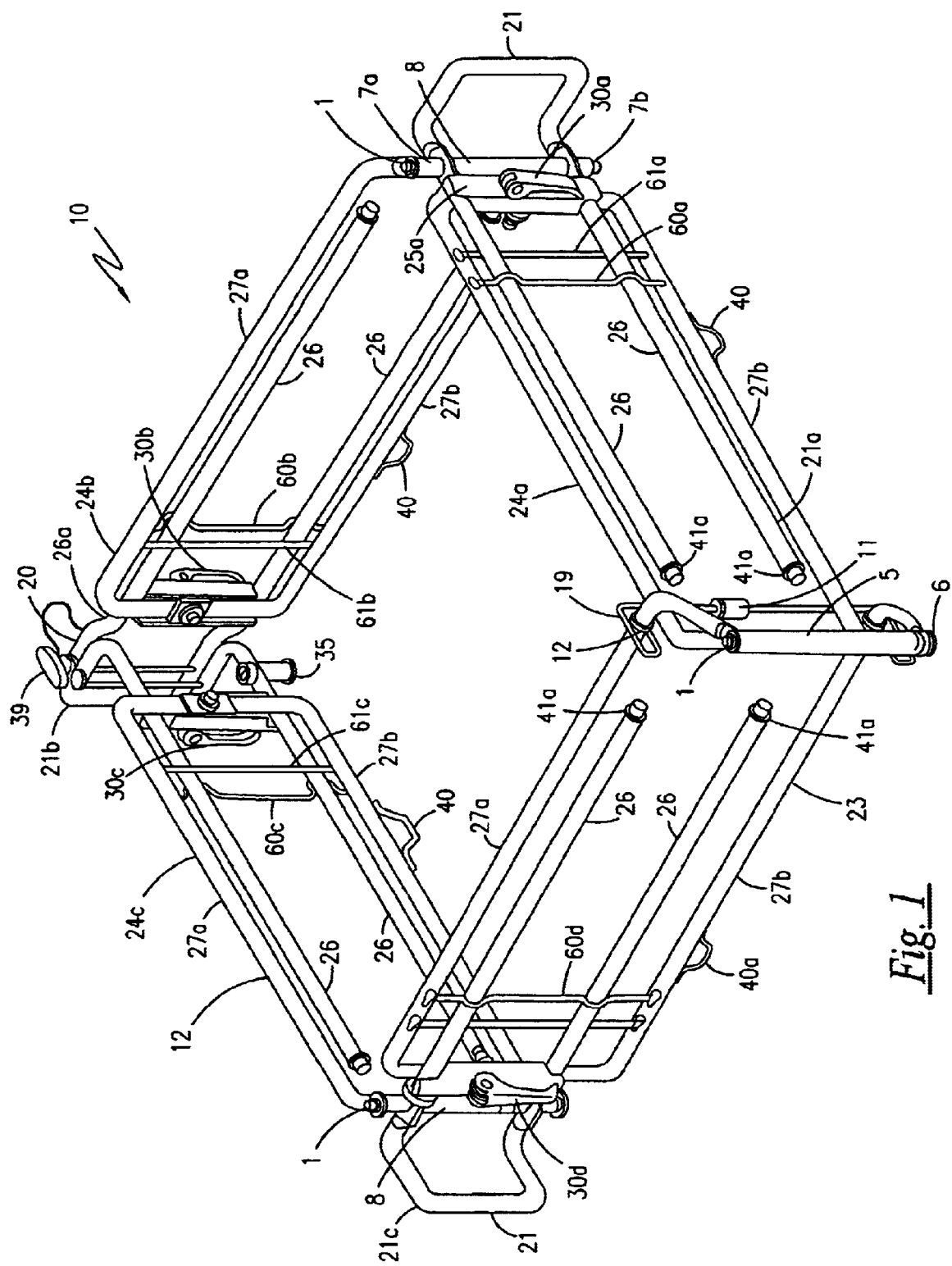
FIG. 1 is a perspective view of a portable, scalably adjustable cargo securement apparatus according to the preferred embodiment of the present invention.

Referring now to FIGS. 1–4, a portable, scalably adjustable cargo securement apparatus 10 is shown, according to the present invention, comprised of a plurality of laterally extensible rail members 21a, 21b, a plurality of longitudinally extensible rail members 20, 21c, a plurality of elongated stabilizer arbors 23, 24a, 24b, 24c, a plurality of impingement locking brackets 25a, 25b, 25c, 25d, and a plurality of feet 40, 40a. The laterally extensible rail members 21a, 21b are designed and configured to travel in a lateral path, or left and right, as depicted by a pair of direction arrows a, b, while the longitudinally extensible rail members 20, 21c are designed and configured to travel in a longitudinal path, or forward and backward, as depicted by a pair of direction arrows x,y.

The portable, scalably adjustable cargo securement apparatus 10, hereinafter referred to as securement apparatus 10, is adapted to be utilized in a cargo area of sport utility vehicles. It is envisioned that the securement apparatus 10 is also adapted for use with luggage racks of sport utility vehicles.

The laterally extensible rail members 21a, 21b, the longitudinally extensible rail members 20, 21c, and the stabilizer arbors 23, 24a, 24b 24c are fabricated of a lightweight, strong metal material such as aluminum. It is envisioned, however, that a fabrication material consisting of a rigid plastic material can be utilized as well, thus facilitating construction of rail members 20, 21c, 21a, 21b, and arbors 23, 24a, 24b 24c via injection molding.

Rail members 20, 21c, 21a, 21b, and stabilizer arbors 23, 24a, 24b, 24c are defined as having an elongated, tubular configuration generally circular in cross-section which interconnect via the plurality of impingement locking brackets 25a, 25b, 25c, 25d so as to form a generally square-shaped framework 12 for confining cargo within its boundaries.

Each laterally extensible rail member 21a, 21b, is U-shaped and includes a perpendicularly-oriented, bighted end portion 21 terminating into elongated, parallel rail arms 26, and wherein each laterally extensible rail member 21a, 21b has a guide rod 60a, and 60c, respectively, traversing an external circumferential surface thereof. Each longitudinally extensible rail member 20, 21c, is U-shaped and includes a perpendicularly-oriented, bighted end portion 21 terminating into elongated, parallel rail arms 26, and wherein each longitudinally extensible rail member 20, 21c has a guide rod 60b, and 60d, respectively, traversing an external circumferential surface thereof. Longitudinally extensible rail member 20 more specifically defines the bighted end portion 21 thereof as extending into elongated parallel arms 26 having a slightly downward-sloping section therein forming a Z-shaped bend 26a which extends outward laterally from the Z-shaped bend 26a in a parallel manner. The Z-shaped bend 26a facilitates flush abutment of an inner circumferential sidewall of the bighted end portion 21 of longitudinally extensible rail member 20 with an outer circumferential sidewall of the bighted end portion 21 of laterally extensible rail member 21b. Rail member 21c has a medial sleeve 8 perpendicularly mounted between parallel rail arms 26 thereof with a top cap 1 affixed there atop. Rail member 21a has a medial sleeve 8 perpendicularly mounted between parallel rail arms 26 thereof utilizing washers 4, and wherein medial sleeve 8 of rail member 21a separates an upper short sleeve 7a and a lower short sleeve 7b, whereby such sleeves 7a, 7b being mounted utilizing washers 4 and lock nuts 2. A top cap 1 is affixed atop upper short sleeve 7a of rail member 21a and a bottom cap 6 is snapped in an interference type fit to a lower short sleeve 7b of rail member 21a.

Each elongated stabilizer arbor 23, 24a, 24b, 24c is generally defined as having a U-shaped configuration with elongated parallel rail arms 27a, 27b. Stabilizer arbor 23 includes an elongated sleeve 5, perpendicularly mounted between elongated, parallel rail arms 27a, 27b thereof via washer 4 spacer 3, and lock nut 2. A top cap 1 is affixed atop each lock nut 2.

Each elongated stabilizer arbor 23, 24a, 24b, 24c is further defined as having a vertical support bar 61d, 61a, 61b, and 61c, respectfully, mounted perpendicularly therebetween so as to enhance structural rigidity during lateral and longitudinal adjustment. A stop clasp 19 of an elongated configuration having a midshaft 19c terminating into annular ends 19a, 19b, is removably attached between the rail arms 27a, 27b of stabilizer arbor 23. The stop clasp 19 provides an abutment against which stabilizer arbor 23 (to be described in greater detail below) mechanically engages. The clasp 19 includes a positional pin support 13 extending downwardly from annular end 19a towards the midshaft 19c, and wherein positional pin support 13 is secured thereagainst via pin retainment band 11.

Referring now more specifically to FIGS. 1, 4, and 5, the impingement locking brackets 25a, 25c are mounted to laterally extensible rail members 21a, 21b respectively, and impingement locking brackets 25b, 25d are mounted to longitudinally extensible rail members 20, 21c respectively, via a plurality of cam locking assemblies 30a, 30c, 30b, and 30d, respectively. Each cam locking assembly 30a, 30b, 30c, 30d includes a pivotal cam locking handle 31 being spring-biased with a threaded bolt 31 a extending therefrom through cam locking bracket 25a, 25b, 25c, 25d and through stabilizer arbors 23, 24a, 24b, 24c. Threaded bolt 31a has a lock nut 33 threadedly engaging an end thereof. Each pivotal cam locking handle 31 is designed and configured such that when handle 31 is pivoted to a downward position, the impingement locking brackets 25a, 25b, 25c, and 25d mechanically impinge against a respective rail member 21a, 20, 21b, 21c, thereby securely maintaining the securement apparatus 10 in a fixed position. When each handle 31 is pivoted upward, mechanical impingement is released from each rail member 21a, 20, 21b, 21c, thus allowing for lateral and longitudinal adjustability thereof.

The impingement locking brackets 25a, 25b, 25c, 25d function to allow for selective, lateral and longitudinal slidable engagement by laterally extensible rail members 21a, 21b, and longitudinally extensible rail members 20, 21c, thereby providing a longitudinally and laterally adjustable securement apparatus for accommodating cargo of varying dimensions and effectively confining such cargo within its boundaries.

Figure 2:
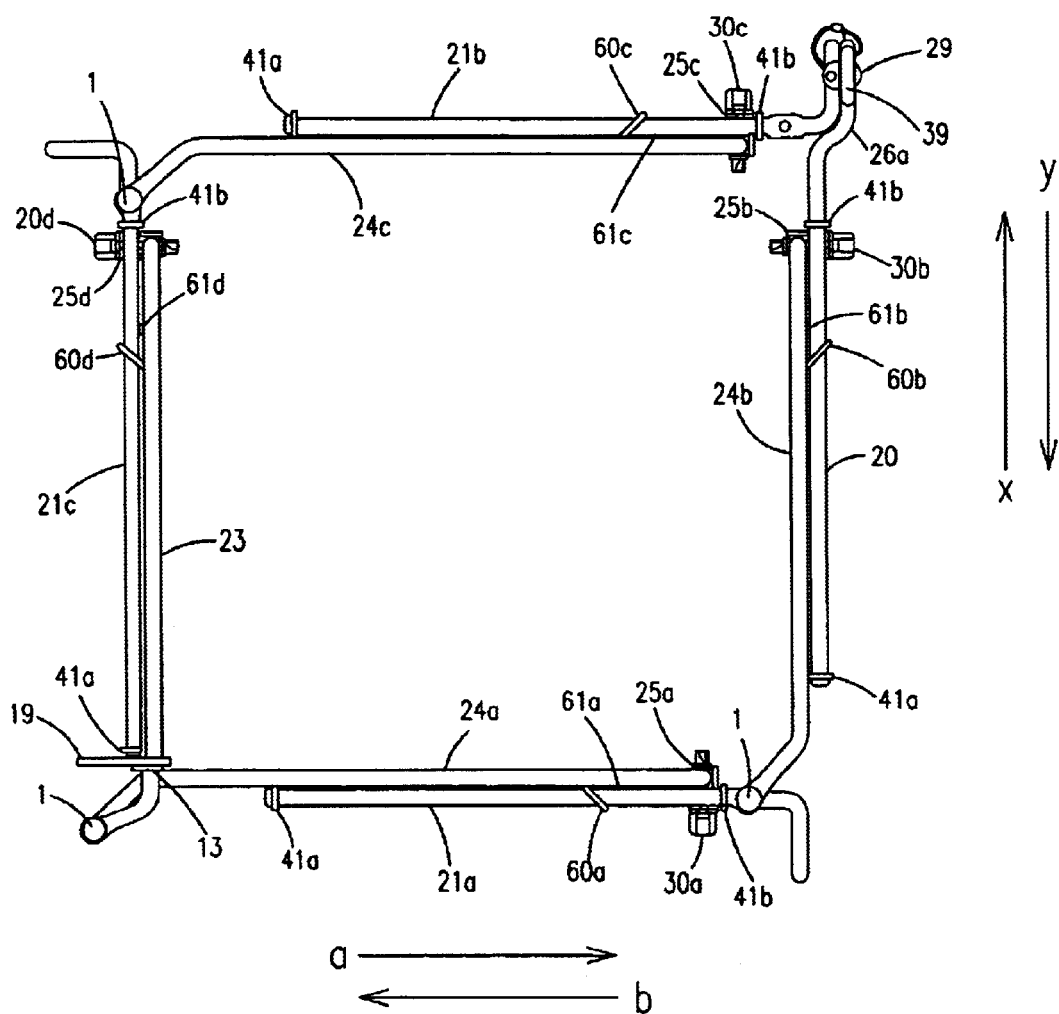
FIG. 2 is a top plan view thereof.
Figure 3:
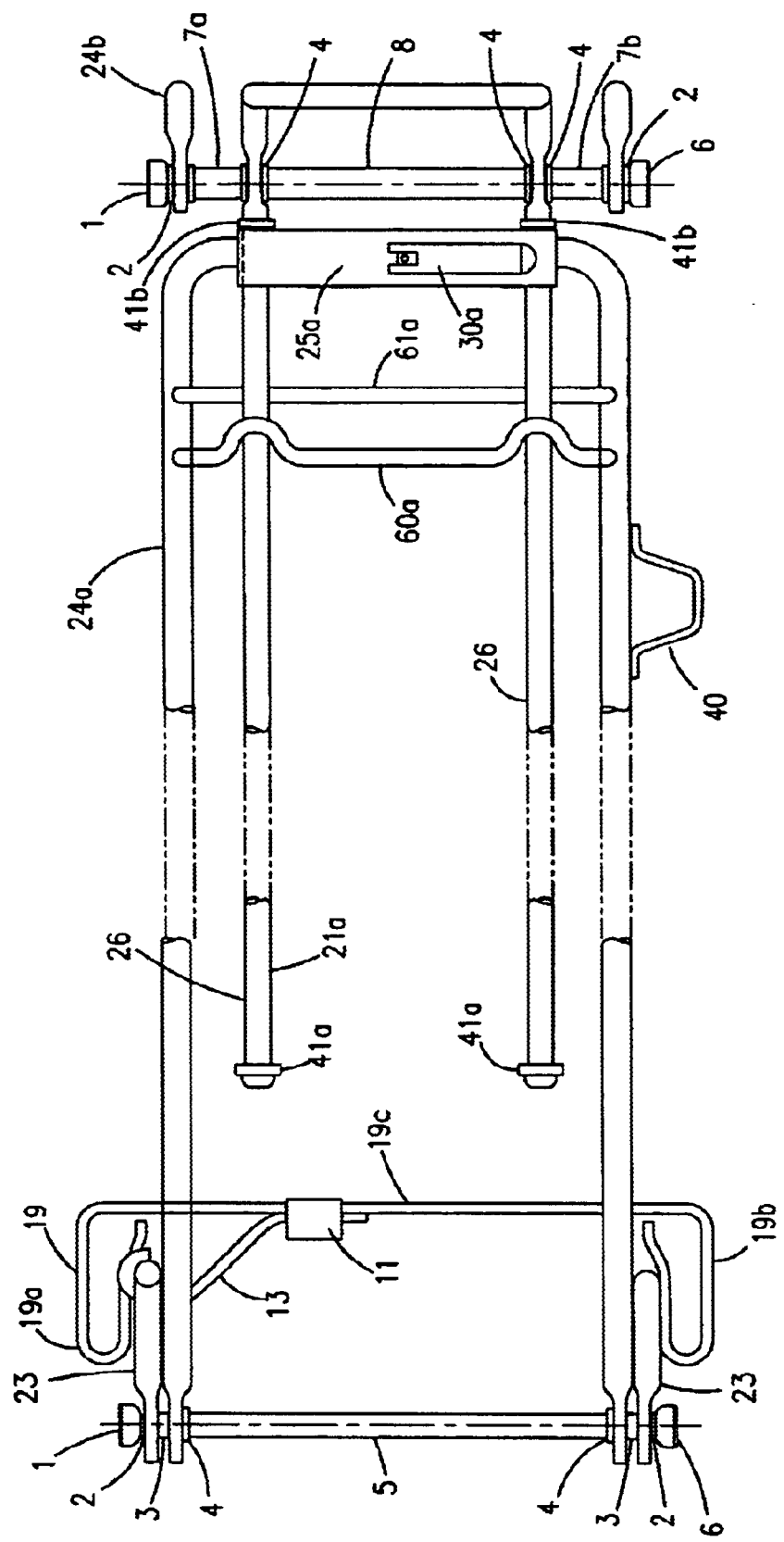
FIG. 3 is a partial front end elevational view thereof.
Figure 7:
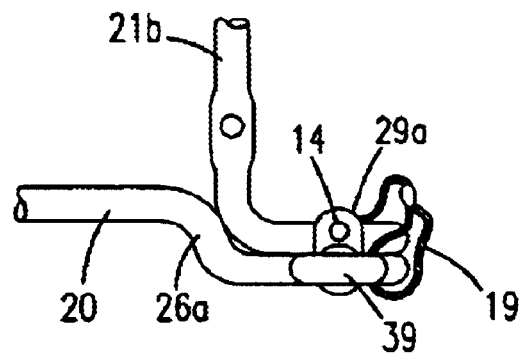
FIG. 7 is a top plan view of the cam pin and lanyard.
Figure 8:
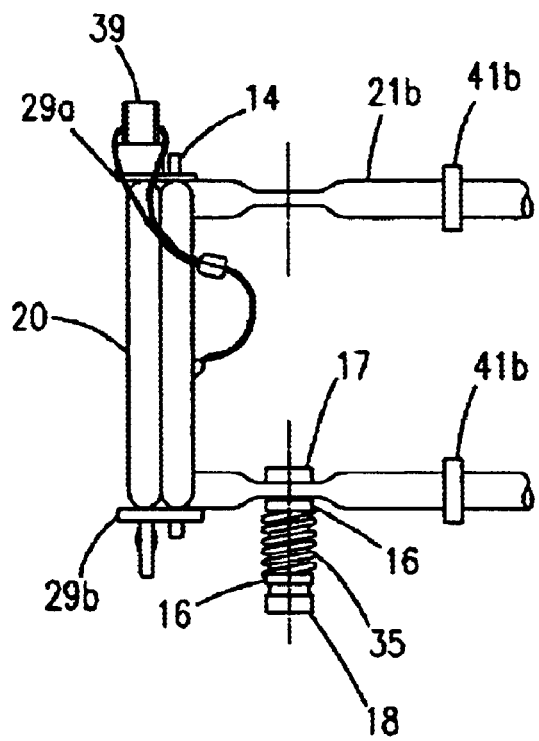
FIG. 8 is a partial side elevational view of the leveling means.

Referring now to FIGS. 1–3, each laterally extensible rail member 21a, 21b and each longitudinally extensible rail member 20, 21c further includes laterally opposed stop rings 41a, 41b, mounted along each elongated, parallel rail arm 26. First stop rings 41a are mounted parallel, opposite to bighted end portions 21, at ends of laterally extensible rail member 21a, 21b, and longitudinally extensible rail member 20, 21c, while second stop rings 41b are mounted parallel, and adjacent to bighted end portions 21 of laterally extensible rail member 21a, 21b, and longitudinally extensible rail member 20, 21c. The first stop ring 41a mechanically interferes with a respective guide rod 60a, 60b, 60c, 60d, and the second stop ring 41b mechanically interferes with a respective impingement locking bracket 25a, 25b, 25c, and 25d, thus restricting lateral and longitudinal, slidable adjustment of each respective rail member 21a, 20, 21b, and 21c. The first stop rings 41a and second stop rings 41b allow for a maximum lateral and longitudinal distance of adjustability by each rail member 20, 21a, 21b, 21c, and also prevent inadvertent complete removal thereof from the securement apparatus 10.

Referring generally to FIGS. 1–2, and more specifically to FIGS. 4–8, a cam pin 39 extends perpendicularly through an end of longitudinally extensible rail member 20 and is held fixedly in place via a pair of opposed locking flanges 29a, 29b. A lanyard 15 is provided having a looped end 15a passing through cam pin knob 39a and an opposite end attached to a support rod 14 which extends perpendicularly through an end of laterally extensible rail member 21b.

In order to facilitate congruous leveling of the securement apparatus 10, laterally extensible rail member 21b and longitudinally extensible rail member 21c are each equipped with a leveling means 35, shown herein as a threaded adjustment stud 18 threadedly received within a lower section of parallel members 26 thereof. Each threaded adjustment stud 18 includes a pair of washers 16. A top cap 17 is affixed atop each threaded adjustment stud 18.

The securement apparatus 10 is designed and configured so as to be laterally extensible from approximately 24 inches to approximately 48 inches, and longitudinally extensible from approximately 24 inches to approximately 48 inches.

Being both lightweight and laterally and longitudinally extensible, the securement apparatus 10 not only provides a device which effectively prevents the shifting of cargo, but also provides an easily removable device readily scalable to a relatively small size facilitating transportability.

Finally, referring to FIGS. 1 and 3, a plurality of feet 40, 40a are disclosed, wherein each foot 40, 40a is of a C-shaped configuration. Feet 40 are affixed to an underside of each rail arm 27b of each stabilizer arbor 24a, 24b, 24c along a linearly elongated centerline thereof, and foot 40a is affixed to an underside of rail arm 27b of stabilizer arbor 23. Foot 40a is further defined as having a greater measurable size as compared to feet 40. The plurality of feet 40, 40a function to bear against a cargo floor, thereby according additional balanced stability to the securement apparatus 10.

2. Operation of the Preferred Embodiment

To use the present invention, the user places the securement apparatus 10 within the cargo area of the sport utility vehicle. User first inserts cam pin 39 through longitudinally extensible rail member 20. User next pivots each handle 31 to an upward position removing mechanical interference between the impingement locking brackets 25a, 25b, 25c, and 25d and a respective rail member 21a, 20, 21b, 21c, thus allowing for their lateral and longitudinal adjustability. The user then simply laterally and longitudinally adjusts each rail member 21a, 20, 21b, 21c to a desired dimension for effectively confining cargo within securement apparatus's 10 boundaries. Finally, once user chooses a proper lateral and longitudinal dimension, each handle 31 is pivoted in a downward position, thereby facilitating impingement of the impingement locking brackets 25a, 25b, 25c, and 25d against the laterally and longitudinally extensible rail members 21a, 21b, and 20, 21c so as to securely maintain the securement apparatus 10 in a fixed position for effectively confining cargo therein.

The use of the present invention aids in securely confining cargo of various dimensions within the cargo area of a sport utility vehicle in a manner which is quick, easy, and efficient.

As designed, a device embodying the teachings of the present invention is easily applied. The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. A cargo securement apparatus comprising:
a plurality of laterally extensible rail members, said plurality of laterally extensible rail members having an elongated, tubular configuration generally circular in cross-section;
a plurality of longitudinally extensible rail members, said plurality of longitudinally extensible rail members having an elongated, tubular configuration generally circular in cross-section;
a plurality of elongated stabilizer arbors, said plurality of elongated stabilizer arbors having an elongated, tubular configuration generally circular in cross-section;
a plurality of impingement locking brackets;
a leveling means; and
a plurality of feet.

2. The cargo securement apparatus of claim 1, wherein said plurality of laterally extensible rail members, said plurality of longitudinally extensible rail members, and said plurality of elongated stabilizer arbors interconnect via said plurality of impingement locking brackets so as to form a generally square-shaped framework for confining cargo within the framework boundaries.

3. The cargo securement apparatus of claim 1, wherein said plurality of laterally extensible rail members is U-shaped and each of said plurality of laterally extensible rail members includes a perpendicularly-oriented, bighted end portion terminating into elongated, parallel rail arms, and wherein each said laterally extensible rail member has a guide rod traversing an external circumferential surface of said laterally extensible rail member.

4. The cargo securement apparatus of claim 1, wherein said plurality of longitudinally extensible rail members is U-shaped and each of said plurality of longitudinally extensible rail members includes a perpendicularly-oriented, bighted end portion terminating into elongated, parallel rail arms, and wherein each said longitudinally extensible rail member has a guide rod traversing an external circumferential surface of said longitudinally extensible rail member.

5. The cargo securement apparatus of claim 1, wherein said plurality of longitudinally extensible rail members defines a rail member which has a medial sleeve perpendicularly mounted between said rail members.

6. The cargo securement apparatus of claim 1, wherein said plurality of laterally extensible rail members defines a rail member which has a medial sleeve perpendicularly mounted between said rail members, and wherein said medial sleeve separates an upper short sleeve and a lower short sleeve, whereby said upper short sleeve and said lower short sleeve are mounted to said medial sleeve utilizing washers and lock nuts.

7. The cargo securement apparatus of claim 1, wherein said plurality of elongated stabilizer arbors are generally defined as having a U-shaped configuration, wherein a stabilizer arbor of said plurality of elongated stabilizer arbors includes an elongated sleeve perpendicularly mounted between elongated, parallel rail arms of said plurality of elongated stabilizer arbors.

8. The cargo securement apparatus of claim 1, wherein each stabilizer arbor of said plurality of elongated stabilizer arbors includes a vertical support bar mounted perpendicularly therebetween so as to enhance structural rigidity during lateral and longitudinal adjustment of said cargo securement apparatus.

9. The cargo securement apparatus of claim 3, wherein each of said plurality of laterally extensible rail members and each of said plurality of longitudinally extensible rail members include laterally opposed stop rings mounted along each said parallel rail arm, wherein said laterally opposed stop rings include first stop rings mounted parallel and opposite to each said bighted end portion, at ends of each said rail arm, and second stop rings mounted parallel and adjacent to each said bighted end portion, whereby each said first stop ring mechanically interferes with a respective said guide rod and each said second stop ring mechanically interferes with a respective impingement locking bracket, thus restricting lateral and longitudinal, slidable adjustment of each said plurality of laterally extensible rail members and of each said plurality of longitudinally extensible rail members.

10. The cargo securement apparatus of claim 1, further comprising a stop clasp of an elongated configuration having a midshaft terminating into annular ends, wherein said stop clasp is removably attached between said rail members of a stabilizer arbor of said plurality of elongated stabilizer arbors, said stop clasp provides an abutment against which a first stop ring of said stabilizer arbor mechanically engages.

11. The cargo securement apparatus of claim 1, further comprising a cam pin which extends perpendicularly through an end of one of said laterally extensible rail members, wherein said cam pin is held fixedly in place via a pair of opposed locking flanges.

12. The cargo securement apparatus of claim 11, wherein said cam pin defines a cam pin knob, said cam pin knob having a looped end of a lanyard passing through said cam pin knob, and wherein said lanyard having an opposite end attached to a support rod which extends perpendicularly through an end of one of said laterally extensible rail members.

13. The cargo securement apparatus of claim 1, wherein said plurality of impingement locking brackets are mounted to said longitudinally extensible rail members and said laterally extensible rail members via a plurality of cam locking assemblies, wherein each cam locking assembly of said plurality of cam locking assemblies includes a pivotal cam locking handle being spring-biased with a pin extending from said pivotal cam locking handle through each impingement locking bracket of said plurality of impingement locking brackets and through said stabilizer arbors.

14. The cargo securement apparatus of claim 13, wherein said pivotal cam locking handle is designed and configured so as to facilitate mechanical impingement by said impingement locking brackets against said plurality of longitudinally extensible rail members and said plurality of laterally extensible rail members and release of mechanical impingement by said impingement locking brackets, thereby providing a longitudinally and laterally adjustable securement apparatus for accommodating cargo of varying dimensions and effectively confining such cargo within said securement apparatus's boundaries.

15. The cargo securement apparatus of claim 1, wherein said leveling means is defined as a threaded adjustment stud threadedly received within a parallel member of a laterally extensible rail member of said plurality of laterally extensible rail members and a parallel member of a longitudinally extensible rail member of said plurality of longitudinally extensible rail members in order to facilitate congruous leveling of said securement apparatus.

16. The cargo securement apparatus of claim 1, wherein each foot of said plurality of feet is of a C-shaped configuration and is coupled to an underside of each said rail member of each stabilizer arbor along a linearly elongated centerline of each said rail member, and wherein said plurality of feet function to bear against a cargo floor, thereby according additional balanced stability to said cargo securement apparatus.

17. The cargo securement apparatus of claim 1, wherein said cargo securement apparatus is adapted to be utilized in a cargo area of sport utility vehicles, and wherein said cargo securement apparatus is designed and configured so as to be laterally extensible from approximately 24 inches to approximately 48 inches, and longitudinally extensible from approximately 24 inches to approximately 48 inches.

* * * * *